(12) United States Patent
Ido

(10) Patent No.: US 7,625,312 B2
(45) Date of Patent: Dec. 1, 2009

(54) CONTROL DEVICE FOR VEHICLE

(75) Inventor: Daisuke Ido, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 427 days.

(21) Appl. No.: 11/659,502

(22) PCT Filed: Jan. 31, 2006

(86) PCT No.: PCT/JP2006/001947

§ 371 (c)(1),
(2), (4) Date: Feb. 6, 2007

(87) PCT Pub. No.: WO2006/082955

PCT Pub. Date: Aug. 10, 2006

(65) Prior Publication Data

US 2007/0265135 A1  Nov. 15, 2007

(30) Foreign Application Priority Data

Feb. 2, 2005 (JP) ............................. 2005-026582

(51) Int. Cl.
*F16H 59/78* (2006.01)
(52) U.S. Cl. ..................... 477/98; 477/110
(58) Field of Classification Search ............ 477/97, 477/98, 107, 110
See application file for complete search history.

(56) References Cited

U.S. PATENT DOCUMENTS

| 7,128,688 B2 * | 10/2006 | Katou | 477/98 |
| 7,217,222 B2 * | 5/2007 | Centlivre et al. | 477/98 |
| 7,223,205 B2 * | 5/2007 | Etchason et al. | 477/98 |
| 7,247,123 B2 * | 7/2007 | Ohtake et al. | 477/98 |
| 7,399,257 B2 * | 7/2008 | Katou et al. | 477/98 |
| 7,433,770 B2 * | 10/2008 | Inagawa et al. | 701/51 |

FOREIGN PATENT DOCUMENTS

| JP | 62 177356 | 8/1987 |
| JP | 6 193482 | 7/1994 |
| JP | 7 14262 | 3/1995 |
| JP | 7 71284 | 3/1995 |
| JP | 8 303564 | 11/1996 |
| JP | 9 242572 | 9/1997 |
| JP | 10 169771 | 6/1998 |
| JP | 2000 120848 | 4/2000 |
| JP | 2002 242720 | 8/2002 |
| JP | 2003 227337 | 8/2003 |
| JP | 2003 287125 | 10/2003 |
| JP | 2004 218451 | 8/2004 |

* cited by examiner

*Primary Examiner*—Ha D. Ho
(74) *Attorney, Agent, or Firm*—Oblon, Spivak, McClelland, Maier & Neustadt, L.L.P.

(57) ABSTRACT

An ECT-ECU executes a program including the steps of: executing an oil cooler abnormality determination process; if the oil cooler is abnormal and an oil temperature TH is at least an other-component-abnormality-incurring temperature where the oil cooler is abnormal, executing an engine speed limit process where the oil cooler is abnormal; if the oil cooler is not abnormal and the oil temperature TH is at least an other-component-abnormality-incurring temperature where the oil cooler is normal, executing an engine speed limit process where the oil cooler is normal.

36 Claims, 8 Drawing Sheets

FIG. 3

BASIC TEMPERATURE MAP (FOR CALCULATING OTHER-COMPONENT-ABNORMALITY-DETERMINING TEMPERATURE)

| BASIC TEMPERATURE |
|---|
| 80°C |

FIG. 4

VEHICLE STATE CORRECTION VALUE (OUTSIDE AIR TEMPERATURE) MAP

| OUTSIDE AIR TEMPERATURE | CORRECTION TEMPERATURE |
|---|---|
| 0°C | -15°C |
| 30°C | -10°C |
| 50°C | 0°C |

FIG. 5

VEHICLE STATE CORRECTION VALUE (VEHICLE SPEED) MAP

| VEHICLE SPEED | CORRECTION TEMPERATURE |
|---|---|
| 0km/h | -15°C |
| 50km/h | -10°C |
| 100km/h | 0°C |

FIG. 6

LIMIT NE MAP WHERE OIL COOLER IS ABNORMAL

| OTHER-COMPONENT-ABNORMALITY-DETERMINING TEMPERATURE | LIMIT NE |
|---|---|
| 80°C | 2000rpm |
| 100°C | 4000rpm |
| 120°C | 6000rpm |

FIG. 7

LIMIT NE MAP WHERE OIL COOLER IS NORMAL

| OTHER-COMPONENT-ABNORMALITY-DETERMINING TEMPERATURE | LIMIT NE |
|---|---|
| 80°C | 1000rpm |
| 100°C | 2000rpm |
| 120°C | 3000rpm |

FIG. 8

SATURATION TEMPERATURE MAP DEPENDENT ON NE
IN THE ABSENCE OF OIL COOLER

| NE | SATURATION TEMPERATURE |
|---|---|
| 2000rpm | 80°C |
| 4000rpm | 100°C |
| 6000rpm | 120°C |

FIG. 9

SATURATION TEMPERATURE MAP DEPENDENT ON
ENGINE TORQUE

| TORQUE | SATURATION TEMPERATURE |
|---|---|
| 10N·m | 80°C |
| 30N·m | 100°C |
| 50N·m | 120°C |

FIG. 10

LIMIT NE MAP FOR 1st

| OTHER-COMPONENT-ABNORMALITY-DETERMINING TEMPERATURE | LIMIT NE |
|---|---|
| 80°C | 3000rpm |
| 100°C | 4500rpm |
| 120°C | 6000rpm |

FIG. 12

TEMPERATURE INCREASE DEGREE MAP DEPENDENT ON NOUT

| NOUT \ TIME | 1 SECOND | 10 SECONDS | 100 SECONDS |
|---|---|---|---|
| 2000rpm | 0.3°C | 0.8°C | 3.0°C |
| 4000rpm | 0.5°C | 1.2°C | 4.0°C |
| 6000rpm | 0.8°C | 1.6°C | 5.0°C |

FIG. 13

TEMPERATURE DECREASE MAP DEPENDENT ON TH WHERE OIL COOLER IS NORMAL

| TH \ TIME | 1 SECOND | 10 SECONDS | 100 SECONDS |
|---|---|---|---|
| 70°C | 0.3°C | 0.8°C | 3.0°C |
| 100°C | 0.5°C | 1.2°C | 4.0°C |
| 130°C | 0.8°C | 1.6°C | 5.0°C |

FIG. 14

TEMPERATURE INCREASE MAP DEPENDENT ON NOUT FOR 1st

| NOUT \ TIME | 1 SECOND | 10 SECONDS | 100 SECONDS |
|---|---|---|---|
| 2000rpm | 0.3°C | 0.8°C | 3.0°C |
| 4000rpm | 0.5°C | 1.2°C | 4.0°C |
| 6000rpm | 0.8°C | 1.6°C | 5.0°C |

FIG. 15

TEMPERATURE INCREASE MAP DEPENDENT ON VEHICLE SPEED FOR 1st

| VEHICLE SPEED \ TIME | 1 SECOND | 10 SECONDS | 100 SECONDS |
|---|---|---|---|
| 20km/h | 0.3°C | 0.8°C | 3.0°C |
| 40km/h | 0.5°C | 1.2°C | 4.0°C |
| 60km/h | 0.8°C | 1.6°C | 5.0°C |

FIG. 16

TEMPERATURE INCREASE MAP DEPENDENT ON ENGINE TORQUE

| TORQUE \ TIME | 1 SECOND | 10 SECONDS | 100 SECONDS |
|---|---|---|---|
| 10N·m | 0.3°C | 0.8°C | 3.0°C |
| 30N·m | 0.5°C | 1.2°C | 4.0°C |
| 50N·m | 0.8°C | 1.6°C | 5.0°C |

CONTROL DEVICE FOR VEHICLE

TECHNICAL FIELD

The present invention relates to control of a vehicle incorporating an automatic transmission, and particularly, to control for appropriately suppressing an increase in the temperature of a working oil of an automatic transmission.

BACKGROUND ART

An automatic transmission incorporated into a vehicle has a complicated internal structure. The automatic transmission is filled with an ATF (Automatic Transmission Fluid: hereinafter, the ATF may also be referred to as a "working oil", and a temperature of the ATF may be referred to as a "oil temperature") so that it operates smoothly. The ATF transfers power as a hydraulic fluid of a torque converter. It is also used for maintaining the friction characteristic of a multiple disc clutch and/or a brake friction member and for lubrication thereof. It is also used for lubrication of a planetary gear and/or a bearing portion. It also actuates a control valve for switching the gear ratio. The ATF is required to have an appropriate coefficient of friction for implementing smooth connection of the clutch with small shock, to produce less bubbles, to be excellent in low-temperature flowability, to have a viscosity index that hardly changes, to be excellent in heat resistance and acid resistance, to produce less sludge, and not to provide an adverse effect to an oil seal member.

The ATF degrades from an increase in the oil temperature due to overheating of the engine itself or due to rigorous usage, slipping of a hydraulic multiple disc clutch in the automatic transmission, and extended usage of the ATF itself. In particular, the friction characteristic of the ATF is generally regarded to be significantly impaired if the ATF undergoes oxidation (degradation). One factor in facilitating oxidation is an increase in the temperature of the ATF. If the ATF undergoes oxidation, sludge or the like is accumulated on the clutch disc, which causes the clutch to slip.

Accordingly, the ATF is supplied to each part of the automatic transmission using an oil pump provided inside the automatic transmission, and the ATF is circulated between an ATF cooler (hereinafter also referred to as an oil cooler) provided near a radiator for dissipating heat from an engine coolant and the automatic transmission in order to prevent an excessive increase in the temperature. For example, if the ATF cooler fails, the temperature of the ATF increases excessively and components other than the ATF cooler may also be damaged. Thus, the excessive increase in the temperature must appropriately be prevented.

Japanese Patent Laying-Open No. 2002-242720 discloses a vehicle control device that ensures safety by appropriately changing operating conditions if a transmission cooling system has some trouble. The vehicle control device disclosed in the publication is a vehicle control device incorporating an automatic transmission that includes: transmission cooling system diagnose means for comparing a transmission oil temperature with a determination threshold value to diagnose an abnormality in the transmission cooling system; and transmission control means for changing a shifting pattern of the automatic transmission to the higher speed side or for fixing the shifting pattern to a prescribed gear, when the transmission cooling system diagnose means diagnoses that the automatic cooling system is in an abnormally high temperature state.

According to the vehicle control device, a transmission oil temperature of the automatic transmission and a determination threshold value are compared with each other to diagnose an abnormality in the transmission cooling system. When the transmission cooling system is diagnosed to be in the abnormally high temperature state, the shifting pattern of the automatic transmission is changed to the higher speed side or the shifting pattern is fixed to a prescribed gear. Thus, the operation of the automatic transmission is limited, whereby the abnormally high temperature state is solved and safety is ensured.

However, in the vehicle control device disclosed in the aforementioned publication, cause of an increase in the oil temperature is not analyzed and shifting is limited uniformly based on a degree of the increase in the oil temperature. Accordingly, shifting is limited even when it is not necessary, and thus shifting is excessively limited. In such a case, the driver may feel uncomfortable or may feel stress. On the other hand, if an increase in the temperature is not appropriately addressed, the excessive increase in the oil temperature may cause the problem due to degradation of the ATF as described above.

DISCLOSURE OF THE INVENTION

The present invention has been made to solve the aforementioned problem, and an object thereof is to provide a control apparatus for a vehicle that minimizes a decrease in the driving performance and that appropriately controls an increase in the oil temperature without letting the driver feel uncomfortable.

A control apparatus for a vehicle according to one aspect of the present invention controls a vehicle incorporating an automatic transmission. The control apparatus includes: a sensing unit sensing a temperature of a working oil of the automatic transmission; a cooling unit cooling the working oil; an analyzing unit analyzing a cause of an increase in the temperature of the working oil when the temperature of the working oil exceeds a predetermined temperature; and a control unit controlling the vehicle so that the increase in the temperature of the working oil is suppressed, in accordance with the cause of the increase in the temperature.

According to the present invention, the working oil (ATF) of the automatic transmission is cooled by an oil cooler or the like. If the temperature of the working oil increases due to an abnormality in the oil cooler, moisture mixing into the working oil and the like, the analyzing unit analyses the cause of the temperature increase. For example, if it is analyzed that an abnormality in the oil cooler is the cause of the temperature increase, the cause is clear. Therefore, in order for the temperature not to exceed an appropriate temperature of the working oil for a case where the oil cooler is not used (i.e., in order to suppress the increase in the temperature of the working oil), the upper limit of the speed of the engine incorporated into the vehicle is limited, shifting of the automatic transmission is prohibited, or gear is limited while driving. On the other hand, when the cause cannot clearly be analyzed, the increase in the temperature of the working oil is more strongly suppressed than in the case where the cause is clear, to thereby prevent an excessive increase in the temperature. Thus, without excessively limiting the operation of the vehicle, the cause can be analyzed to take measures to suppress the increase in the temperature appropriately. As a result, a control apparatus for a vehicle can be provided, that minimizes a decrease in the driving performance and that appropriately controls an increase in the oil temperature without letting the driver feel uncomfortable.

A control apparatus for a vehicle according to another aspect of the present invention controls a vehicle incorporating an automatic transmission. The control apparatus includes: a sensing unit sensing a temperature of a working oil of the automatic transmission; a cooling unit cooling the working oil; an analyzing unit analyzing a cause of an increase in the temperature of the working oil when the temperature of the working oil exceeds a predetermined temperature; and a control unit controlling the vehicle so that the increase in the temperature of the working oil is suppressed, in accordance with the cause of the increase in the temperature and relationship between the temperature of the working oil and the predetermined temperature.

According to the present invention, the cause of the increase in the temperature can be analyzed, and the increase in the temperature of the working oil can be suppressed in accordance with the cause and the relationship between the temperature of the working oil and a predetermined temperature. For example, three allowable temperatures (a first temperature, a second temperature, and a third temperature in descending order of temperature) are determined in advance for each of the case where the oil cooler is abnormal and the case where it is not abnormal. In respective cases where the oil cooler is abnormal and where it is normal, an engine speed is limited so as not to exceed a first engine speed when the temperature of the working oil exceeds the first temperature, not to exceed a second engine speed when the temperature of the working oil exceeds the second temperature, and not to exceed a third engine speed when the temperature of the working oil exceeds the third temperature. Thus, the increase in the temperature of the working oil can be suppressed in accordance with the cause in the increase in the temperature and the relationship between the temperature of the working oil and the predetermined temperature.

Preferably, the cooling unit includes a radiator and a pump circulating the working oil between the radiator and the automatic transmission. The analyzing unit analyzes whether the cause of the increase in the temperature is a failure of the cooling unit.

According to the present invention, if it is analyzed that the cooling unit fails, the cause is clear than in other cases (for example, where the cause is unclear and the degree of a future temperature increase cannot be estimated). Therefore, the increase in the temperature of the working oil can appropriately be suppressed as moderate limiting, for example.

Further preferably, the control unit controls the vehicle, when the cause is not the failure of the cooling unit, so that the increase in the temperature of the working oil is more strongly suppressed than in a case where the cause is the failure of the cooling unit.

According to the present invention, when the cooling unit does not fail (including the case where the cause is not clear), it is assumed that the degree of the temperature increase cannot be estimated. Therefore, an excessive increase in the temperature can be prevented by suppressing the increase in the temperature of the working oil stronger than in the case where the cooling unit fails.

Further preferably, the control unit controls the vehicle, when the cause is the failure of the cooling unit, so that the increase in the temperature of the working oil is suppressed based on a saturation temperature of the working oil calculated as corresponding to an engine speed for a case where the cooling unit does not operate.

According to the present invention, a saturation temperature of the working oil where the cooling unit is not used is calculated in advance in association with engine speed, and when the cooling unit fails, an increase in the temperature of the working oil can be suppressed based on the saturation temperature.

Further preferably, the control unit controls the vehicle, when the cause is the failure of the cooling unit, so that the increase in the temperature of the working oil is suppressed based on a saturation temperature of the working oil calculated as corresponding to engine torque for a case where the cooling unit does not operate.

According to the present invention, a saturation temperature of the working oil where the cooling unit is not used is calculated in advance in association with engine torque, and when the cooling unit fails, an increase in the temperature of the working oil can be suppressed based on the saturation temperature.

Further preferably, the predetermined temperature changes depending on at least one of an outside air temperature and a vehicle speed.

According to the present invention, since the temperature of the working oil is affected by the outside air temperature, the vehicle speed and the like, the predetermined temperature (for example, a temperature threshold value at which components of the automatic transmission other than the cooling unit can possibly becomes abnormal, even if the cooling unit is normal) is changed. Thus, an increase in the temperature of the working oil can appropriately be prevented.

Further preferably, the control unit controls the engine so that an engine speed is reduced to suppress the increase in the temperature of the working oil.

According to the present invention, the engine speed can be reduced to thereby suppress an increase in the temperature of the working oil of the automatic transmission.

Further preferably, the control unit controls the engine so that an engine speed is reduced, in accordance with the temperature of the working oil of the automatic transmission.

According to the present invention, by reducing the engine speed greater as the oil temperature is higher, or by reducing the engine speed greater as the change in the oil temperature over time is greater, an increase in the temperature can appropriately be prevented.

Further preferably, the control unit controls the engine so that an engine speed is reduced, in accordance with a gear of the automatic transmission.

According to the present invention, since the engine speed is different if the gear is different, the engine speed to be reduced is set for each gear. Thus, an increase in the temperature can appropriately be prevented.

BRIEF DESCRIPTION OF THE DRAWINGS

FIG. 3 is a basic temperature map that is stored in a memory in the ECT-ECU.

FIG. 4 is a vehicle state correction value (outside air temperature) map that is stored in a memory in the ECT-ECU.

FIG. 5 is a vehicle state correction (vehicle speed) map that is stored in the memory in the ECT-ECU.

FIG. 6 is a limit engine speed map where an oil cooler is abnormal that is stored in the memory in the ECT-ECU.

FIG. 7 is a limit engine speed map where the oil cooler is normal that is stored in the memory in the ECT-ECU.

FIG. 8 is a saturation temperature map dependent on engine speed in the absence of the oil cooler that is stored in the memory in the ECT-ECU.

FIG. 9 is a saturation temperature map dependent on engine torque that is stored in the memory in the ECT-ECU.

FIG. 10 is a limit engine speed map for first gear that is stored in the memory in the ECT-ECU.

FIG. 12 is a temperature increase degree map dependent on an output shaft speed of the automatic transmission that is stored in the memory in the ECT-ECU.

FIG. 13 is a temperature decrease degree map dependent on a working oil temperature where the oil cooler is normal that is stored in the memory in the ECT-ECU.

FIG. 14 is a temperature increase degree map dependent on an output shaft speed of the automatic transmission for first gear that is stored in the memory in the ECT-ECU.

FIG. 15 is a temperature increase degree map dependent on a vehicle speed for first gear that is stored in the memory in the ECT-ECU.

FIG. 16 is a temperature increase degree map dependent on engine torque that is stored in the memory in the ECT-ECU.

BEST MODES FOR CARRYING OUT THE INVENTION

Figure 1:
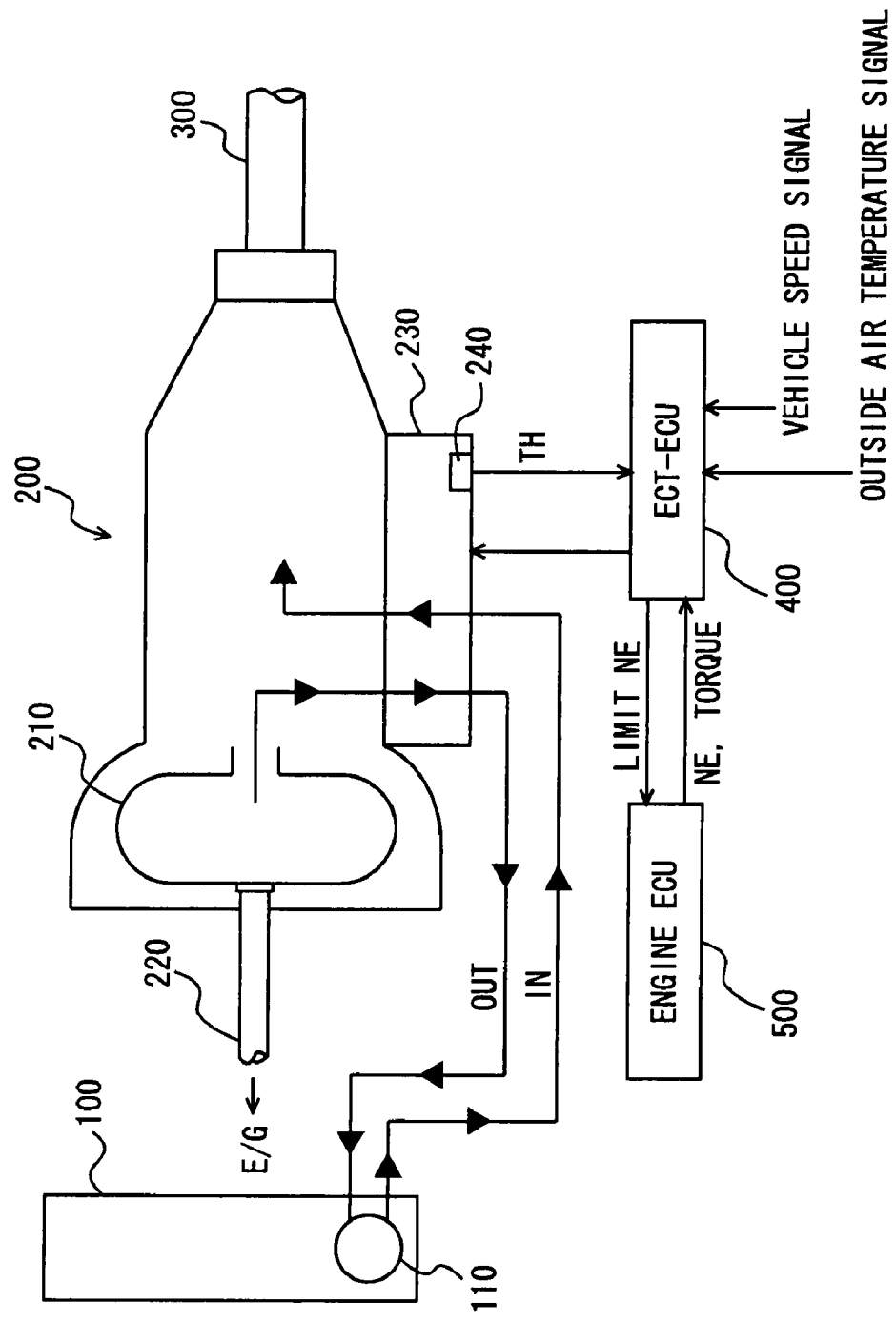
FIG. 1 is a control block diagram of a cooling system of an automatic transmission according to the present embodiment.

In the following, referring to the drawings, an embodiment of the present invention will be described. In the following description, identical components are denoted by an identical reference character. Their name and function are also the same. Accordingly, detailed description thereof will not be repeated.

Referring to FIG. 1, a control block diagram of a cooling system of an automatic transmission according to the present embodiment is shown. A control apparatus according to the present embodiment is implemented by an ECT (Electronically Controlled Automatic Transmission)—ECU (Electronic Control Unit), which will be described later.

As shown in FIG. 1, the cooling system of the automatic transmission cools a working oil (ATF) of an automatic transmission 200 by an ATF cooler (oil cooler) 110 provided near a radiator 100.

Automatic transmission 200 is provided with a torque converter 210 that is a hydraulic coupling, and a plurality of friction engagement elements (a clutch, a brake) provided closer to the output shaft side than to torque converter 210. An oil pump is incorporated into automatic transmission 200, which supplies the ATF accumulated in an oil pan 230 to each of components of automatic transmission 200 such as torque converter 210, friction engagement elements and a control valve.

Automatic transmission 200 is connected to the engine side by an automatic transmission input shaft 220, and connected to the driving wheel side by an automatic transmission output shaft (a propeller shaft) 300.

The ATF is supplied to oil cooler 110 by the oil pump accommodated in automatic transmission 200, and heat is exchanged between the ATF and the air in oil cooler 110, whereby the temperature of the ATF decreases. The heat-exchanged ATF is again returned to automatic transmission 200, and supplied to each component of automatic transmission 200 from oil pan 230.

Automatic transmission 200 is provided with working oil sensor 240 measuring the temperature of the ATF. While FIG. 1 shows working oil sensor 240 being arranged at the lower portion of oil pan 230, the position of working oil sensor 240 is not limited thereto.

ECT-ECU 400 executes shifting control of automatic transmission 200, and slip control of a lock-up clutch if torque converter 210 is provided with the lock-up clutch. To ECT-ECU 400, a signal indicative of an oil temperature TH of the ATF, which is the working oil, is input from working oil sensor 240. To ECT-ECU 400, a vehicle speed signal, an outside air temperature signal and the like are also input.

An engine ECU 500 controlling the engine separately from ECT-ECU 400 is provided. Signals indicative of engine speed NE, engine torque and the like are transmitted from engine ECU 500 to ECT-ECU 400. A limit engine speed NE is transmitted from ECT-ECU 400 to engine ECU 500, and engine ECU 500 controls the engine so as not to exceed limit engine speed NE.

Figure 2:
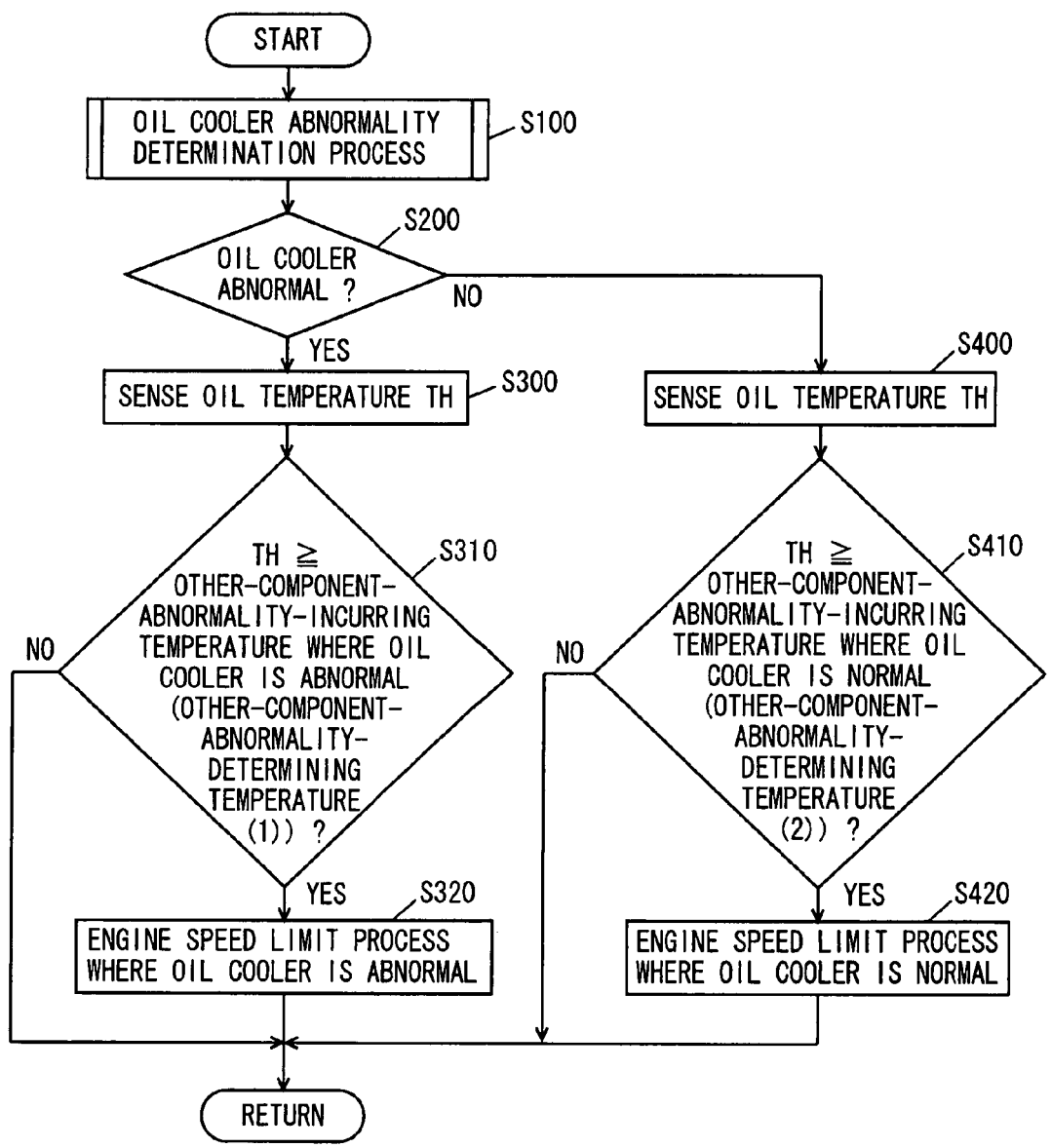
FIG. 2 is a flowchart showing a control structure of a program executed by an ECT-ECU in FIG. 1.

Referring to FIG. 2, a control structure of a program executed by ECT-ECU 400 according to the present embodiment is described.

In step (hereinafter step is abbreviated as S) 100, ECT-ECU 400 executes an oil cooler abnormality determination process (a subroutine). Detail of the oil cooler abnormality determination process will be described later.

In S200, ECT-ECU 400 determines whether oil cooler 110 is abnormal or not. If it is determined that oil cooler 110 is abnormal (YES in S200), then the process goes to S300. Otherwise (NO in S200), the process goes to S400.

In S300, ECT-ECU 400 senses oil temperature TH, which is the temperature of the ATF of automatic transmission 200. Here, ECT-ECU 400 senses oil temperature TH based on a signal indicative of oil temperature TH input from working oil sensor 240 to ECT-ECU 400.

In S310, ECT-ECU 400 determines whether oil temperature TH of the ATF of automatic transmission 200 is at least an other-component-abnormality-incurring temperature (an other-component-abnormality-determining temperature (1)) where oil cooler 110 is abnormal. If oil temperature TH of the working oil of automatic transmission 200 is at least an other-component-abnormality-incurring temperature (other-component-abnormality-determining temperature (1)) where oil cooler 10 is abnormal (YES in S310), then the process goes to S320. Otherwise (NO in S310), the process ends. Other-component-abnormality-determining temperature (1) in S310 is calculated based on a basic temperature map shown in FIG. 3 taking into account of temperature in a vehicle state correction value (outside air temperature) map shown in FIG. 4 and further taking into account of a vehicle state correction value (vehicle speed) map shown in FIG. 5. For example, to the basic temperature shown in FIG. 3, the correction temperature shown in FIG. 4 is added, and further the correction temperature shown in FIG. 5 is added, whereby other-component-abnormality-determining temperature (1) (and an other-component-abnormality-determining temperature (2). described later) is calculated.

In step S320, ECT-ECU 400 executes an engine speed limit process where oil cooler 110 is abnormal. Here, a limit engine speed map where an oil cooler 110 is abnormal shown in FIG. 6 is used. In the map shown in FIG. 6, an other-component-abnormality-determining temperature corresponds to other-component-abnormality-determining temperature (1) in S310.

In step S400, ECT-ECU 400 senses oil temperature TH of the ATF of automatic transmission 200. This process is the same as the process in the above-described S300.

In step S410, ECT-ECU 400 determines whether oil temperature TH of the ATF of automatic transmission 200 is at least an other-component-abnormality-incurring temperature (an other-component-abnormality-determining temperature (2)) where oil cooler 110 is normal. If oil temperature TH of the ATF of automatic transmission 200 is at least the other-component-abnormality-incurring temperature (other-component-abnormality-determining temperature (2)) where oil cooler 110 is normal (YES in S410), then the process goes to S420. Otherwise (NO in S410), the process ends.

In S420, ECT-ECU 400 executes an engine speed limit process where oil cooler 110 is normal. Here, a limit engine speed map where oil cooler 110 is normal shown in FIG. 7 is used. In FIG. 7, an other-component-abnormality-determining temperature is other-component-abnormality-determining temperature (2).

In the limit engine speed map where oil cooler 110 is abnormal shown in FIG. 6, a limit engine speed is set for other-component-abnormality-determining temperature (1). Since this is a case where oil cooler 110 is abnormal (fails), the cause of an increase in the temperature of the ATF is clear. Accordingly, based on a saturation temperature map dependent on an engine speed in the absence of oil cooler 110 shown in FIG. 8, the limit engine speed map where oil cooler 110 is abnormal is set.

Further, when there is correlation between, for example, engine torque and an increase in the temperature of the ATF of automatic transmission 200, a saturation temperature map dependent on engine torque as shown in FIG. 9 may be used. That is, the limit engine speed map where oil cooler 110 is abnormal shown in FIG. 6 may be corrected using the saturation maps such as shown in FIGS. 8 and 9.

In the limit engine speed map where oil cooler 110 is normal shown in FIG. 7, a limit engine speed is set for other-component-abnormality-determining temperature (2). As can be seen from comparison between FIGS. 6 and 7, the limit engine speed where oil cooler 110 is abnormal is more moderate than that where oil cooler 110 is normal. Here, when oil cooler 110 is normal, the temperature of the ATF so increases that it exceeds the other-component-abnormality-determination temperature, despite oil cooler 110 being normal. Since the cause thereof is unclear (it is not at least an abnormality of oil cooler 110), engine speed NE is limited to be lower so that the increase in the temperature of the ATF can more strongly be suppressed. It is noted that the engine speed in the limit engine speed map shown in FIG. 7 is the engine speed with which the minimum operation of the vehicle is possible.

As shown in FIG. 10, when an increase in the temperature of the ATF of automatic transmission 200 is different by the engine speed for each gear being implemented, a control map for engine speed may be provided for each gear.

Figure 11:
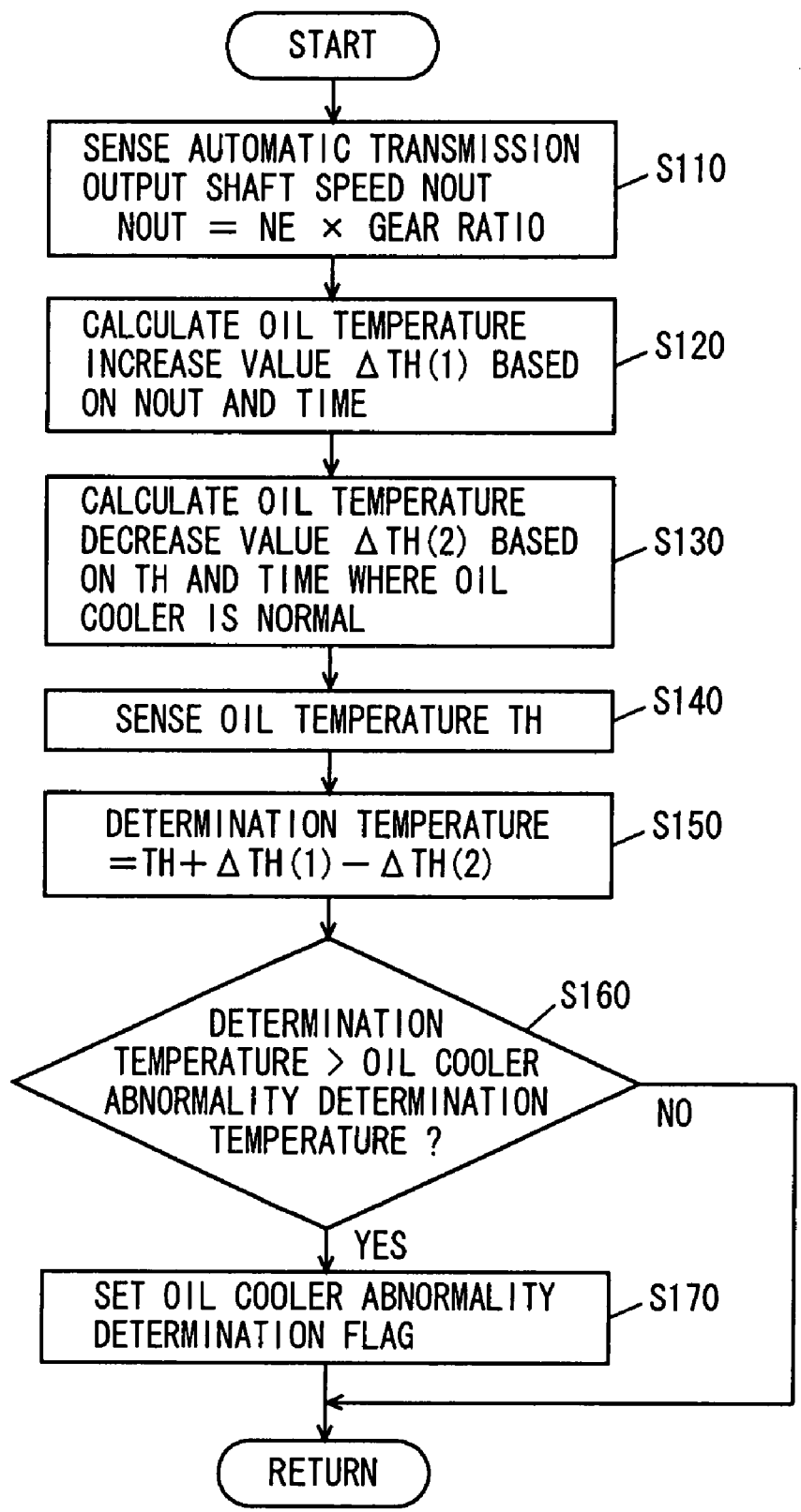
FIG. 11 is a flowchart showing a control structure of an oil cooler abnormality determination process in the flowchart of FIG. 2.

Referring to FIG. 11, a control structure of a program of the oil cooler abnormality determination process in S100 of FIG. 1 is described.

In S110, ECT-ECU400 senses an automatic transmission output shaft speed NOUT. Here, NOUT is calculated from engine speed NE× gear ratio.

In S120, ECT-ECU400 calculates an oil temperature increase value Δ TH (1) based on automatic transmission output shaft speed NOUT and time. Here, as shown in FIG. 12, a temperature increase degree map dependent on automatic transmission output shaft speed NOUT is used.

In S130, an oil temperature decrease value Δ TH (2) based on oil temperature TH and time where oil cooler 110 is normal is calculated. Here, a temperature decrease degree map dependent on working oil temperature where oil cooler 110 is normal is used.

In S140,ECT-ECU400 senses oil temperature TH. In S150, ECT-ECU400 performs the following operation to obtain a determination temperature:

determination temperature=oil temperature $TH+\Delta TH(1)-\Delta TH(2)$

In S160, ECT-ECU 400 determines whether the determination temperature calculated in S150 is higher than an oil cooler abnormality determination temperature or not. If the determination temperature is higher than the oil cooler abnormality determination temperature (YES in S160), the process goes to S170. Otherwise (NO in S160), the process ends.

In S170, ECT-ECU 400 sets an oil cooler abnormality determination flag. When the oil cooler abnormality determination flag is set in S170, it is determined that oil cooler 110 is abnormal in S200 of FIG. 2.

Since the temperature increase abnormality of the ATF is different by the output shaft speed of automatic transmission 200, the temperature increase degree is mapped based on experimental data, for example, and incorporated into control. This corresponds to the temperature increase map and the temperature decrease map shown in FIGS. 12 and 13, respectively.

When the increase in temperature of the ATF of automatic transmission 200 is different for each gear being implemented, the following may be possible.

For example, as shown in FIG. 14, a temperature increase degree map may be provided for each engine speed and for each gear. It is noted that FIG. 14 shows only the example where the gear is 1st.

Further, it may also be possible to employ a temperature increase degree map wherein vehicle speed is used in place of automatic transmission output shaft speed NOUT of FIG. 14. Such a temperature increase degree map is shown in FIG. 15. That is, a temperature increase degree map is set for each vehicle speed and for each gear.

Further, when there is correlation between engine torque and an increase in temperature of the ATF of automatic transmission 200, the relationship between engine torque and temperature increase degree may be mapped. Such a temperature increase degree map is shown in FIG. 16.

Such a temperature increase degree is mapped as shown in FIGS. 14-16 so that the temperature increase degree map as shown in FIG. 12 is corrected. The temperature decrease degree map as shown in FIG. 13 may also be corrected similarly to the temperature increase degree map, using the maps shown in FIGS. 14-16.

An operation of a cooling system of an automatic transmission controlled by ECT-ECU 400 implementing the control apparatus according to the present embodiment based on the above-described structure and flowcharts is described.

<When Oil Cooler 110 is Abnormal>

When oil cooler 110 is abnormal, the oil cooler abnormality determination flag is set (S170), and oil cooler 110 is determined to be abnormal (YES in S200). Oil temperature TH of the ATF of automatic transmission 200 is sensed (S300), and if oil temperature TH is at least an other-component-abnormality-incurring temperature (an other-component-abnormality-determining temperature (1)) where oil cooler 110 is abnormal (YES in S310), the engine speed limit process where oil cooler 110 is abnormal is executed (S320). Here, the limit engine speed map where oil cooler 110 is abnormal shown in FIG. 6 is used, and the upper limit of the engine speed is defined corresponding to other-component-abnormality-determining temperature (1).

<When Oil Cooler 110 is Normal>

When oil cooler 110 is normal, the oil cooler abnormality flag is not set, and oil cooler 110 is not determined to be abnormal (NO in S200). Oil temperature TH of the ATF of automatic transmission 200 is sensed (S400), and if oil temperature TH is at least an other-component-abnormality-incurring temperature (other-component-abnormality-determining temperature (2)) where oil cooler 110 is normal (YES in S410), an engine speed limit process where oil cooler 110 is normal is executed (S420). Here, the limit engine speed map where oil cooler 110 is normal shown in FIG. 7 is used.

When oil cooler 110 is normal, in contrast to the case where oil cooler 110 is abnormal, the cause of an increase in the temperature of ATF is unknown. Therefore, in order to more positively prevent a further increase in the temperature, the limit engine speed is set low to prevent the engine speed from becoming high, whereby a further increase in the temperature of the ATF is more strongly suppressed.

As above, according to the control apparatus of the present embodiment, when there is an increase in the temperature of the ATF of the automatic transmission and if the increase is such an extent that an abnormality of other components is induced, whether the factor of the increase in the temperature is dependent on an abnormality of the oil cooler or not is determined. If the oil cooler is abnormal, control is provided so that the increase in the temperature of the ATF is more moderately suppressed than in the case where the oil cooler is normal (if the oil cooler is normal, control is provided so that the increase in the temperature of the ATF is more strongly suppressed than in the case where the oil cooler is abnormal). Thus, unnecessary temperature limit control is not executed and the vehicle is allowed to be operated normally as much as possible.

It should be understood that the embodiments disclosed herein are illustrative and non-restrictive in every respect. The scope of the present invention is defined by the terms of the claims, rather than the description above, and is intended to include any modifications and changes within the scope and meaning equivalent to the terms of the claims.

The invention claimed is:

1. A control apparatus for a vehicle incorporating an automatic transmission, comprising:
    a sensing unit sensing a temperature of a working oil of said automatic transmission;
    a cooling unit cooling said working oil;
    an analyzing unit analyzing a cause of an increase in the temperature of said working oil when the temperature of said working oil exceeds a predetermined temperature; and
    a control unit controlling said vehicle so that the increase in the temperature of said working oil is suppressed, in accordance with the cause of the increase in the temperature.

2. The control apparatus for the vehicle according to claim 1, wherein
    said cooling unit includes a radiator and a pump circulating said working oil between said radiator and said automatic transmission, and
    said analyzing unit analyzes whether the cause of the increase in the temperature is a failure of said cooling unit.

3. The control apparatus for the vehicle according to claim 2, wherein
    said control unit controls said vehicle, when the cause is not the failure of said cooling unit, so that the increase in the temperature of said working oil is more strongly suppressed than in a case where the cause is the failure of said cooling unit.

4. The control apparatus for the vehicle according to claim 2, wherein
    said control unit controls said vehicle, when the cause is the failure of said cooling unit, so that the increase in the temperature of said working oil is suppressed based on a saturation temperature of said working oil calculated as corresponding to an engine speed for a case where said cooling unit does not operate.

5. The control apparatus for the vehicle according to claim 2, wherein
    said control unit controls said vehicle, when the cause is the failure of said cooling unit, so that said increase in the temperature of said working oil is suppressed based on a saturation temperature of said working oil calculated as corresponding to engine torque for a case where said cooling unit does not operate.

6. The control apparatus for the vehicle according to claim 1, wherein
    said predetermined temperature changes depending on at least one of an outside air temperature and a vehicle speed.

7. The control apparatus for the vehicle according to claim 1, wherein
    said control unit controls said engine so that an engine speed is reduced to suppress the increase in the temperature of said working oil.

8. The control apparatus for the vehicle according to claim 1, wherein
    said control unit controls said engine so that an engine speed is reduced, in accordance with the temperature of said working oil of said automatic transmission.

9. The control apparatus for the vehicle according to claim 1, wherein
    said control unit controls said engine so that an engine speed is reduced, in accordance with a gear of said automatic transmission.

10. A control apparatus for a vehicle incorporating an automatic transmission, comprising:
    a sensing unit sensing a temperature of a working oil of said automatic transmission;
    a cooling unit cooling said working oil;
    an analyzing unit analyzing a cause of an increase in the temperature of said working oil when the temperature of said working oil exceeds a predetermined temperature; and
    a control unit controlling said vehicle so that the increase in the temperature of said working oil is suppressed, in accordance with the cause of the increase in the temperature and relationship between the temperature of said working oil and said predetermined temperature.

11. The control apparatus for the vehicle according to claim 10, wherein
    said cooling unit includes a radiator and a pump circulating said working oil between said radiator and said automatic transmission, and
    said analyzing unit analyzes whether the cause of the increase in the temperature is a failure of said cooling unit.

12. The control apparatus for the vehicle according to claim 11, wherein
    said control unit controls said vehicle, when the cause is not the failure of said cooling unit, so that the increase in the temperature of said working oil is more strongly suppressed than in a case where the cause is the failure of said cooling unit.

13. The control apparatus for the vehicle according to claim 11, wherein
    said control unit controls said vehicle, when the cause is the failure of said cooling unit, so that the increase in the temperature of said working oil is suppressed based on a saturation temperature of said working oil calculated as corresponding to an engine speed for a case where said cooling unit does not operate.

14. The control apparatus for the vehicle according to claim 11, wherein
said control unit controls said vehicle, when the cause is the failure of said cooling unit, so that said increase in the temperature of said working oil is suppressed based on a saturation temperature of said working oil calculated as corresponding to engine torque for a case where said cooling unit does not operate.

15. The control apparatus for the vehicle according to claim 10, wherein
said predetermined temperature changes depending on at least one of an outside air temperature and a vehicle speed.

16. The control apparatus for the vehicle according to claim 10, wherein
said control unit controls said engine so that an engine speed is reduced to suppress the increase in the temperature of said working oil.

17. The control apparatus for the vehicle according to claim 10, wherein said control unit controls said engine so that an engine speed is reduced, in accordance with the temperature of said working oil of said automatic transmission.

18. The control apparatus for the vehicle according to claim 10, wherein said control unit controls said engine so that an engine speed is reduced, in accordance with a gear of said automatic transmission.

19. A control apparatus for a vehicle incorporating an automatic transmission, comprising:
sensing means for sensing a temperature of a working oil of said automatic transmission;
cooling means for cooling said working oil;
analyzing means for analyzing a cause of an increase in the temperature of said working oil when the temperature of said working oil exceeds a predetermined temperature; and
control means for controlling said vehicle so that the increase in the temperature of said working oil is suppressed, in accordance with the cause of the increase in the temperature.

20. The control apparatus for the vehicle according to claim 19, wherein
said cooling means includes a radiator and a pump circulating said working oil between said radiator and said automatic transmission, and
said analyzing means includes means for analyzing whether the cause of the increase in the temperature is a failure of said cooling means.

21. The control apparatus for the vehicle according to claim 20, wherein
said control means includes means for controlling said vehicle, when the cause is not the failure of said cooling means so that the increase in the temperature of said working oil is more strongly suppressed than in a case where the cause is the failure of said cooling means.

22. The control apparatus for the vehicle according to claim 20, wherein
said control means includes means for controlling said vehicle, when the cause is the failure of said cooling means, so that the increase in the temperature of said working oil is suppressed based on a saturation temperature of said working oil calculated as corresponding to an engine speed for a case where said cooling means does not operate.

23. The control apparatus for the vehicle according to claim 20, wherein
said control means includes means for controlling said vehicle, when the cause is the failure of said cooling means, so that said increase in the temperature of said working oil is suppressed based on a saturation temperature of said working oil calculated as corresponding to engine torque for a case where said cooling means does not operate.

24. The control apparatus for the vehicle according claim 19, wherein
said predetermined temperature changes depending on at least one of an outside air temperature and a vehicle speed.

25. The control apparatus for the vehicle according to claim 19, wherein
said control means includes means for controlling said engine so that an engine speed is reduced to suppress the increase in the temperature of said working oil.

26. The control apparatus for the vehicle according to claim 19, wherein
said control means includes means for controlling said engine so that an engine speed is reduced, in accordance with the temperature of said working oil of said automatic transmission.

27. The control apparatus for the vehicle according to claim 19, wherein
said control means includes means for controlling said engine so that an engine speed is reduced, in accordance with a gear of said automatic transmission.

28. A control apparatus for a vehicle incorporating an automatic transmission comprising:
sensing means for sensing a temperature of a working oil of said automatic transmission;
cooling means for cooling said working oil;
analyzing means for analyzing a cause of an increase in the temperature of said working oil when the temperature of said working oil exceeds a predetermined temperature; and
control means for controlling said vehicle so that the increase in the temperature of said working oil is suppressed, in accordance with the cause of the increase in the temperature and relationship between the temperature of said working oil and said predetermined temperature.

29. The control apparatus for the vehicle according to claim 28, wherein
said cooling means includes a radiator and a pump circulating said working oil between said radiator and said automatic transmission, and
said analyzing means includes means for analyzing whether the cause of the increase in the temperature is a failure of said cooling means.

30. The control apparatus for the vehicle according to claim 29, wherein
said control means includes means for controlling said vehicle, when the cause is not the failure of said cooling means, so that the increase in the temperature of said working oil is more strongly suppressed than in a case where the cause is the failure of said cooling means.

31. The control apparatus for the vehicle according to claim 29, wherein
said control means includes means for controlling said vehicle, when the cause is the failure of said cooling means, so that the increase in the temperature of said working oil is suppressed based on a saturation temperature of said working oil calculated as corresponding to an engine speed for a case where said cooling means does not operate.

32. The control apparatus for the vehicle according to claim 29, wherein
said control means includes means for controlling said vehicle, when the cause is the failure of said cooling means, so that said increase in the temperature of said working oil is suppressed based on a saturation temperature of said working oil calculated as corresponding to engine torque for a case where said cooling means does not operate.

33. The control apparatus for the vehicle according to claim 28, wherein
said predetermined temperature changes depending on at least one of an outside air temperature and a vehicle speed.

34. The control apparatus for the vehicle according to claim 28, wherein
said control means includes means for controlling said engine so that an engine speed is reduced to suppress the increase in the temperature of said working oil.

35. The control apparatus for the vehicle according to claim 28, wherein
said control means includes means for controlling said engine so that an engine speed is reduced, in accordance with the temperature of said working oil of said automatic transmission.

36. The control apparatus for the vehicle according to claim 28, wherein said control means includes means for controlling said engine so that an engine speed is reduced, in accordance with a gear of said automatic transmission.

* * * * *